(12) United States Patent
Terwilliger et al.

(10) Patent No.: US 9,967,759 B2
(45) Date of Patent: *May 8, 2018

(54) INFORMATION HANDLING SYSTEM PHYSICAL COMPONENT MAINTENANCE THROUGH NEAR FIELD COMMUNICATION DEVICE INTERACTION

(71) Applicant: Dell Products L.P., Round Rock, TX (US)

(72) Inventors: Kevin D. Terwilliger, Austin, TX (US); Orin M. Ozias, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/940,628

(22) Filed: Nov. 13, 2015

(65) Prior Publication Data
US 2016/0073276 A1 Mar. 10, 2016

Related U.S. Application Data

(63) Continuation of application No. 13/754,178, filed on Jan. 30, 2013, now Pat. No. 9,198,060.

(51) Int. Cl.
*H04B 5/00* (2006.01)
*H04W 24/04* (2009.01)

(52) U.S. Cl.
CPC .......... *H04W 24/04* (2013.01); *H04B 5/0031* (2013.01)

(58) Field of Classification Search
CPC ........ G06F 3/023; G06F 15/16; G06F 15/177; G06F 8/67; G06F 9/54; G06F 9/44505; H04B 5/0031; H04B 5/02; G05B 2219/31457; G05B 2219/36542; H04L 43/0817; H04L 2209/34; H04L 9/0825

See application file for complete search history.

(56) References Cited

U.S. PATENT DOCUMENTS

| | | | |
|---|---|---|---|
| 7,188,333 B1 | 3/2007 | LaMotta et al. | |
| 8,335,489 B2 | 12/2012 | Hamada | |
| 8,368,594 B2 | 2/2013 | Khan et al. | |
| 9,002,267 B2 | 4/2015 | Cooper | |
| 9,124,655 B2 | 9/2015 | Terwilliger et al. | |
| 2003/0191877 A1 | 10/2003 | Zaudtke et al. | |
| 2005/0071689 A1* | 3/2005 | Coward | G06F 1/189 713/300 |
| 2005/0216729 A1* | 9/2005 | Joels | H04L 9/0844 713/153 |
| 2007/0190939 A1 | 8/2007 | Abel | |
| 2007/0015463 A1 | 10/2007 | Abel et al. | |

(Continued)

OTHER PUBLICATIONS

Dell, Dell Chassis Management Controller, 2012 httP://web.archive.org/web/20121226152743/http://en.community.dell.com/techcenter/systems-management/w/wiki/1987.dell-chassis-management-controller.aspx.

*Primary Examiner* — James Yang
(74) *Attorney, Agent, or Firm* — Terrile, Cannatti, Chambers & Holland, LLP; Robert W. Holland

(57) ABSTRACT

Information handling system maintenance is aided by sending maintenance codes with a management processor of the information handling system to a mobile telephone with a NFC communication. The maintenance code and an identifier of the information handling system are provided to an administrative station to confirm that the proper maintenance is taking place at the proper system before the maintenance is authorized.

13 Claims, 3 Drawing Sheets

(56) References Cited

U.S. PATENT DOCUMENTS

| | | | |
|---|---|---|---|
| 2007/0254634 A1* | 11/2007 | Costa-Requena | H04W 8/245 455/412.1 |
| 2008/0090595 A1 | 4/2008 | Liu et al. | |
| 2008/0117847 A1 | 5/2008 | Hamada | |
| 2008/0126627 A1 | 5/2008 | Chandrasekhar et al. | |
| 2008/0133032 A1* | 6/2008 | Arima | G05B 9/02 700/79 |
| 2008/0155257 A1 | 6/2008 | Werner et al. | |
| 2008/0215844 A1 | 9/2008 | Thomas | |
| 2009/0013258 A1* | 1/2009 | Hintermeister | G06F 11/328 715/736 |
| 2009/0187668 A1 | 7/2009 | Arendt et al. | |
| 2009/0254479 A1 | 10/2009 | Pharris | |
| 2009/0281904 A1 | 11/2009 | Pharris | |
| 2010/0144277 A1 | 6/2010 | Hsieh | |
| 2010/0277866 A1* | 11/2010 | Chen | G06F 21/74 361/679.57 |
| 2010/0279610 A1 | 11/2010 | Bjorhn et al. | |
| 2010/0306305 A1 | 12/2010 | DeHaan | |
| 2011/0055636 A1 | 3/2011 | DeHaan et al. | |
| 2011/0191252 A1 | 8/2011 | Dai | |
| 2011/0208659 A1 | 8/2011 | Easterly et al. | |
| 2011/0296404 A1 | 12/2011 | Zhang et al. | |
| 2011/0311094 A1 | 12/2011 | Herzog et al. | |
| 2012/0151040 A1 | 6/2012 | Mouravyov et al. | |
| 2012/0185317 A1 | 7/2012 | Wong | |
| 2012/0185398 A1 | 7/2012 | Weis et al. | |
| 2012/0185579 A1 | 7/2012 | Watanabe | |
| 2012/0253852 A1 | 10/2012 | Pourfallah et al. | |
| 2012/0253973 A1 | 10/2012 | Harter | |
| 2012/0267432 A1 | 10/2012 | Kuttuva | |
| 2012/0290731 A1 | 11/2012 | Suumaki et al. | |
| 2012/0295540 A1* | 11/2012 | Hong | H04M 1/72561 455/41.1 |
| 2012/0315848 A1 | 12/2012 | Smith et al. | |
| 2013/0013759 A1 | 1/2013 | Austen et al. | |
| 2013/0026232 A1* | 1/2013 | Zhou | G06Q 20/3274 235/380 |
| 2013/0036322 A1* | 2/2013 | Bauer | H04L 41/0668 714/4.1 |
| 2013/0173915 A1 | 7/2013 | Haulund | |
| 2013/0198019 A1 | 8/2013 | Smith | |
| 2013/0204918 A1 | 8/2013 | Ashok et al. | |
| 2013/0204948 A1* | 8/2013 | Zeyliger | G06F 9/44505 709/206 |
| 2013/0215467 A1 | 8/2013 | Fein et al. | |
| 2013/0244704 A1 | 9/2013 | Szabo | |
| 2013/0326510 A1 | 12/2013 | Adekile et al. | |
| 2014/0068040 A1* | 3/2014 | Neti | G06F 9/485 709/223 |
| 2014/0074346 A1* | 3/2014 | Chiaverini | G07C 5/008 701/31.5 |
| 2015/0065114 A1 | 3/2015 | Dua | |
| 2016/0233926 A1 | 8/2016 | Asakura | |

\* cited by examiner

INFORMATION HANDLING SYSTEM PHYSICAL COMPONENT MAINTENANCE THROUGH NEAR FIELD COMMUNICATION DEVICE INTERACTION

CONTINUING DATA

This application is a continuation of U.S. patent application Ser. No. 13/754,178, filed Jan. 20, 2013, now U.S. Pat. No. 9,198,060, issued Nov. 24, 2015, which is incorporated herein by reference in its entirety.

CROSS REFERENCE TO RELATED APPLICATIONS

U.S. patent application Ser. No. 13/754,073, entitled "Information Handling System Operational Management Through Near Field Communication Device Interaction," inventors Kevin D. Terwilliger and Orin M. Ozias, filed on same day herewith, describes exemplary methods and systems and is incorporated by reference in its entirety.

U.S. patent application Ser. No. 13/754,127, entitled "Information Handling System Physical Component Inventory To Aid Operational Management Through Near Field Communication Device Interaction," inventors Kevin D. Terwilliger and Orin M. Ozias, filed on same day herewith, describes exemplary methods and systems and is incorporated by reference in its entirety.

BACKGROUND OF THE INVENTION

Field of the Invention

The present invention relates in general to the field of information handling system operational management, and more particularly to information handling system physical component maintenance through near field communication device interaction.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often disposed in data centers that maintain a suitable environment for the systems to efficiently run, such as an environment with adequate power and cooling resources. A typical data center includes multiple racks that each supports multiple information handling systems. Generally, information handling systems interface with each other through a network defined by network addresses that interconnect through switching and routing devices. A typical data center has information handling systems that perform a variety of functions, such as servers that support websites and information storage. Often, the functions performed within a data center are distributed across multiple information handling systems with virtualization and related techniques. For example, a particular website with a defined Internet Protocol (IP) address is presented by a virtual machine flexibly executing on various physical information handling systems in a data center so that physical processing resources are efficiently utilized. Generally, communication with virtual network addresses is supported by mapping of the virtual systems to their physical resources.

The increased size of data centers and the increased use of virtualization have made management of physical information handling system resources more difficulty. For instance, failure of an end user application, such as a website or database, often has little relationship to any particular physical processing resource. Fortunately, if a physical resource fails virtualization typically includes fail over so that applications move from failed physical processing resources to operational processing resources. Similarly, redundant storage systems used by storage area networks and other networked based storage help to ensure that information remains accessible through back-up sources even if a particular physical storage device fails. Thus, data center information technology specialists are typically provided time to fix or replace failed physical resources without substantial impact on processing operations.

One difficulty faced by information technology specialists is identifying physical processing resource failures, locating the actual failed devices in a data center and properly configuring replacement devices with appropriate network and physical addressing information. Generally, management of physical resources within an information handling system is performed by a management network that parallels the data center's end user operational network. Physical devices deployed in a data center include management controllers that monitor physical operating parameters and report the parameters through the management network to a data center manager. For instance, information handling systems typically include a baseboard management controller (BMC) that provides remote power up and power down of the information handling system through an out-of-band management network. The BMC often interfaces with the management network through a chassis management controller (CMC) disposed on the rack that supports the information handling system. CMC's manage physical resources at a rack level, such as by allocating power and cooling resources to information handling systems disposed in the rack. Often, management controllers are included at very low level components to monitor operations and identify failures, such as switches, routers, power supplies, cooling fans, storage devices, etc.

Larger data centers will often have a "crash cart" that moves between racks to fix physical resources as failures occur and are reported through the management network. Indicators at racks and devices within racks provide information technology specialists with an indication of the location where repairs are needed, such as by illuminating an LED at the front and or rear of a rack. In a busy data center, ongoing maintenance may result in a good number of indicators being illuminated leading to confusion as to the physical resources in need of attention. Further, as devices in a data center are repaired and replaced, tracking an inventory of devices that are currently in use—versus originally installed—can present a substantial challenge. Replacing or installing existing devices with incompatible devices or incorrectly configured devices can result in additional failures and suboptimal data center performance.

SUMMARY OF THE INVENTION

Therefore a need has arisen for a system and method which aids in operational management of information handling systems, such as the location and identification of processing resources associated with information handling system repair and replacement.

In accordance with the present invention, a system and method are provided which substantially reduce the disadvantages and problems associated with previous methods and systems for operational management of information handling systems. NFC communications by a portable information handling system proximate to the information handling system under management allows physical confirmation of operational management decisions by an end user with information directly and indirectly obtained for the information handling system under management.

More specifically, in one example embodiment, an NFC interface directly into a server information handling system management processor allows development of table of configurations for the server prior to its deployment in a data center. A mobile telephone having a NFC device taps against a NFC device integrated in the server to retrieve a unique identifier that allows a look up of the pre-developed configuration table to configure the server with the settings of the table by transferring the settings with a second NFC communication. In the deployment process, the management processor provides an inventory of components included in the information handling system for later reference. As components change over time due to maintenance and replacement, hardware components change. A NFC communication from a mobile phone initiates an up-to-date inventory of components by the management controller, which provides the inventory to the mobile telephone with a second NFC communication. An image of the interior of the information handling system chassis is presented at a display of the mobile telephone to allow the end user to see the configuration before actually opening the chassis. In addition, the inventory provides the network connections of the information handling system, such as switches and storage solutions, so that an end user can validate the connections while physically present at the information handling system. If NFC capability is included in connected network devices, a valid connection may be confirmed with a NFC communication at each side of the connection. View network connections in this manner provides a view of the ecosystem of the information handling system within the data center to aid in planning cable strategies, etc.

During maintenance, NFC communication confirms that a desired system is being addressed with compatible parts by an authorized end user. For example, a remote technician deployed in a data center approaches information handling systems for repair based upon visual indicators presented at the chassis. NFC communication with an information handling system confirms that the correct system is being addressed versus other systems that have visual indicators illuminated. NFC communication retrieves maintenance codes for presentation at a mobile telephone to allow an end user to see what needs repair and how to repair it, such as with a video of an example repair operation. An administrative station monitors NFC communications from remote mobile telephones to authorize repairs to help make sure that the correct system is receiving the correct repairs. In one embodiment, a lock prevents access to an information handling system chassis unless authorized by NFC communication results. If component having repairs, such as a hard disk drive, includes a NFC device, the component can also provide configuration information to the portable information handling system, such as the shipping and deployment dates of the component, a history of use, speed, size, etc.

The present invention provides a number of important technical advantages. One example of an important technical advantage is that a NFC device interfaces directly with an information handling system management controller to retrieve configuration information for deployment of the information handling system at the physical location of the NFC device. During initial deployment of an information handling system, an information technology specialist retrieves information from an NFC tag installed in the information handling system and interfaced with the management controller of the information handling system to aid with configuration of the information handling system at the data center. For example, a unique identifier retrieved from the NFC tag allows a smartphone to look up the information handling system in a table and retrieve settings that are then automatically downloaded to the information handling system, such as through communication with the NFC device. Information pushed down to a server management controller with NFC communication includes IP address, MAC address, BIOS settings, and end user specific settings, which are related to a physical location by the NFC device.

Another advantage of the present invention is that information handling systems installed in a data center are readily approached to inventory their processing resources and operational status. For example, a management controller captures a quick image of an information handling system's hardware configuration and provides the configuration in response to a query at an NFC device interfaced with the management controller. The hardware image reflects an actual configuration of the information handling system taken with a smartphone NFC device so that the hardware image is tied to a physical location known to an information technology specialist. The hardware image includes identifiers of components within an information handling system or chassis so that replacement of failed devices is confirmed before physical access is attempted at the information handling system.

Another advantage is that physical network connections and associated addresses are confirmed at deployment and repair of information handling systems based upon interactions between management controllers and NFC devices. Once an installation or repair of an information handling system is complete, proper deployment is confirmed with smartphone NFC and wireless local area network interfaces (WLAN) to the information handling system. For example, a proper configuration with correct addressing will allow the smartphone NFC device and WLAN device to interact with the same management controller. Other indicia of proper configuration may be provided, such as illumination of LEDs at the information handling system or chassis. In one embodiment, physical locks to secure access to an information handling system are managed by communication through both a local NFC device and a network interface to provide added security and monitoring of access to physical systems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Near field communication between an information handling system and a mobile telephone enhances information handling system management with on-location configuration, location verification, inventory and repair at the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
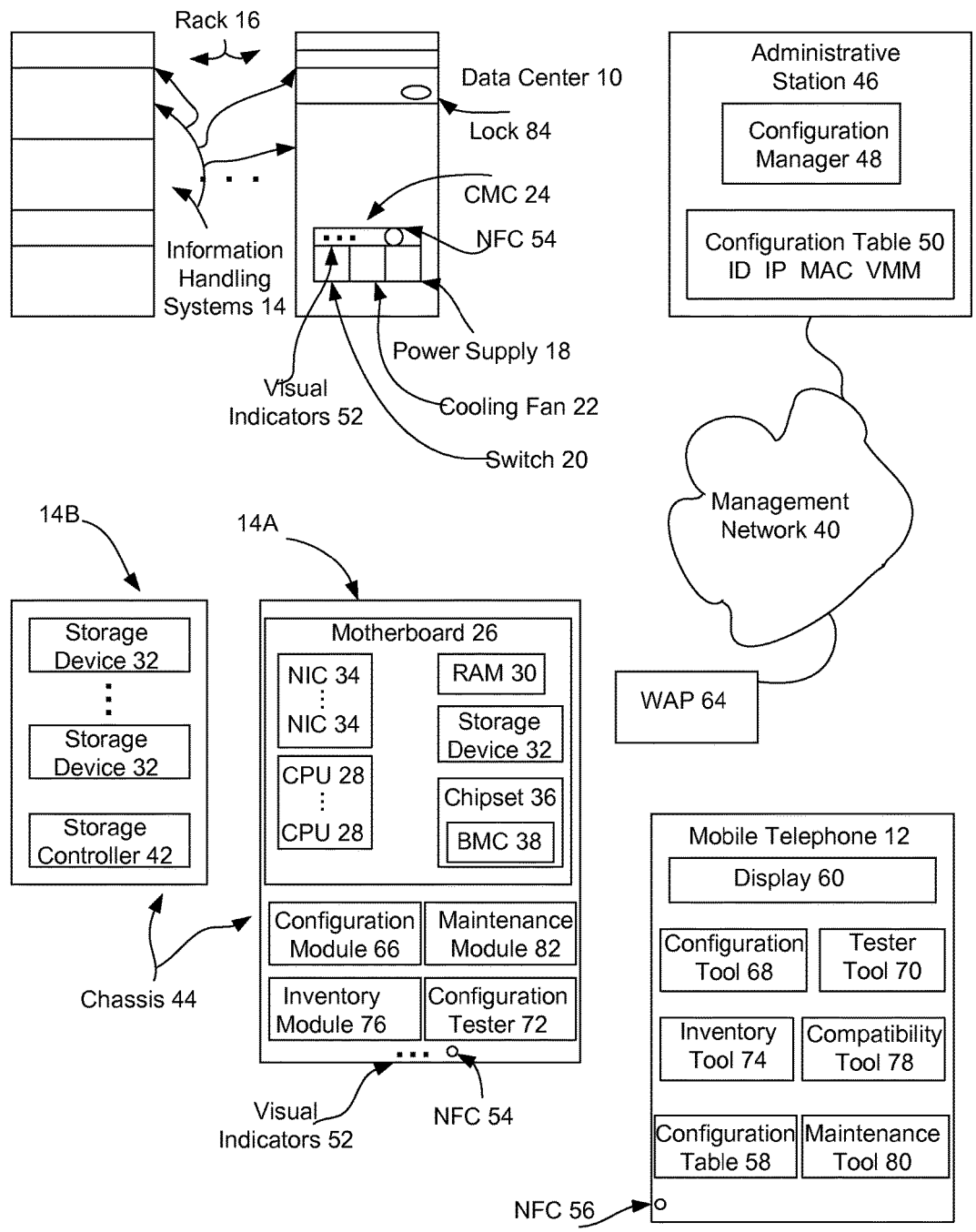
FIG. 1 depicts a block diagram of a data center having information handling system management enhanced with NFC communication by a mobile phone with managed information handling systems.

Referring now to FIG. 1, a block diagram depicts a data center 10 having information handling system management enhanced with NFC communication by a mobile phone 12 with managed information handling systems 14. In the example embodiment, information handling systems 14 are deployed to data center 10 in racks 16, each of which supports plural information handling systems 10. For example, a rack 16 provides infrastructure that supports application of power to information handling systems 14, such as with redundant power supplies 18, that supports communication between information handling systems 14, such as one or more switches 20, and that supports communication cooling of information handling systems 14, such as one or more cooling fans 22. Rack 16 includes a chassis management controller 24 that provides rack level management of information handling systems 14 and rack infrastructure.

Information handling systems 14 within a rack 16 may perform a variety of functions and may include specialized hardware and software components to handle specialized functions in a more efficient manner. For example, information handling system 14A is configured to perform server functions, such as serving up web pages for a website. A motherboard 26 interfaces plural central processing units (CPU) 28 that execute instructions, such as responding to network communications, and memory for storing instructions and information for use by CPUs 28, such as random access memory (RAM) 30 and persistent storage devices 32, like hard disk drives and solid state drives. Network communications are supported with plural network interface cards 34 (NICs) that provide ports for connecting with a switch 20. Cooperation between components of information handling system 14A is coordinated by a chipset 36, which includes a variety of specialized processors that typically execute firmware instructions, such as a graphics processor, a memory controller, a bus controller, a Basic Input/Output System (BIOS), a LAN on Motherboard (LOM), etc. . . . . A baseboard management controller (BMC) 38 provides out-of-band control of information handling system 14A with hooks into the components disposed on motherboard 26 and an interface with a management network 40 that communicates management information. For instance, BMC 38 allows remote interfaces through management network 40 to power up and power down processors 28 and other components, as well as to perform other management functions, like updating firmware.

Information handling system 14B provides another example of an information handling system that specializes in storage and retrieval of information. Information handling system 14B has plural storage devices 32 managed by a storage controller 42, such as to support a storage area network (SAN) or other type of storage configuration with Ethernet, Fibre channel or other types of interfaces. Information handling systems 14 generally include a BMC 38 or other type of management processor that monitors the operation of components within an information handling system chassis 44 to detect faults, monitor performance and perform management functions like updating firmware. Information technology specialists interact with information handling systems 14 through communications through management network 40 using an administrative station 46. The administrative station includes a configuration manager 48 that manages the hardware, firmware and software configurations of information handling systems 14 and tracks the configurations in a configuration table 50. By applying configuration settings through a management controller 38 to an information handling system 14, information handling system specialists manage functions performed, naming conventions, BIOS settings, network address settings and virtualization settings. For instance, the administrative station 46 might manage operations at information handling systems 14 to provide virtual machines and virtual storage with virtual machine monitors at management controllers to keep virtual machines available at virtual addresses mapped to physical addresses so that end users can flexibly use physical processing resources. The effect is to create a "cloud" that separates physical resources from specific tasks flexibly accomplished by hardware components.

Information handling systems 14 and racks 16 include visual indicators 52 at the exterior of chassis 44 that provide a visual indication of an operating status of an information handling system. For example, visual indicators 52 are LEDs interfaced with BMC 38 and/or CMC 24 to illuminate in a manner that indicates a fault, such as a component failure, at an information handling system 14. If a management controller 38 determines a fault, the management controller will report the fault to administrative station 46 through management network 40 to alert information technology specialists and will illuminate visual indicators 52 with an indication of the particular type of fault, such as with a predetermined sequence of LEDs. Visual indicators 52 help to guide an information handling system specialist to the information handling system for maintenance and indicate the type of maintenance involved, however, if many visual indicators 52 are illuminated, information handling system specialists may have difficulty locating the desired information handling system 14 and addressing the desired maintenance event with a desired maintenance action. If, for instance, an information technology specialist replaces an incorrect component or information handling system, undesired changes to network configurations may result.

In order to simplify maintenance for information technology specialists at a location of an information handling system 14 or rack 16, information handling system 14 and rack 16 include a near field communication (NFC) device 54 that interfaces with a management processor 38 to aid in deployment and maintenance of information handling systems 14. Mobile telephone 12 or other types of portable information handling systems, such as smartphones, laptops and tablets, includes a NFC device 56 external to information handling system 14 so that mobile telephone 12 can interact with management processor 38 by NFC communication between NFC devices 54 and 56. An end user who approaches an information handling system 14 can discover the configuration of components within information handling system 14 and the status of the components by NFC communications with management processor 38. For example, NFC communication with management processor 38 allows mobile telephone 12 to retrieve a configuration table 58 from management processor 38 and compare the configuration table results with information obtained through a local area network interface with administrative station 46, such as by a wireless local area network (WLAN) interface through a wireless access point to management network 40. Results of NFC communication by mobile telephone 12 are presented at a display 60 so that an end user has a physical view of an actual system with a presentation of the components of the system without having to open up the system.

In one embodiment, a configuration module 66 executing on BMC 38 receives configuration information 58 with a NFC communication from mobile telephone 12 using NFC device 56 to communicate with NFC device 54. A configuration tool 68 running on a processor of mobile telephone 12 has configuration information loaded to configuration table 58 from administrative station 46 through a network interface, such as a management network 40 or other local area network interface. Alternatively, configuration information is loaded from alternative sources, such as legacy information handling system 14 being replaced by a new information handling system 14 that will use the same or similar configuration information. In one embodiment, mobile telephone 12 obtains configuration information from a legacy information handling system 14 with a NFC communication to the management processor 38 of the legacy information handling system, stores the configuration information locally or at administrative station 46, and then sends the legacy configuration information to a replacement information handling system 14 with a second NFC communication. A similar approach may be taken where an internal component, such as a storage device, includes a NFC device that communicates component configuration information to mobile telephone 12 so that the component configuration information is stored and transferred to a replacement component.

In one example embodiment, management processor 38 of an information handling system 14 includes a unique identifier for information handling system 14 that is accessible with a NFC communication by mobile telephone 12 to NFC device 54. An end user taps mobile telephone 12 against NFC device 54 to read the unique identifier with a NFC communication. Configuration tool 68 applies the unique identifier to look up a configuration table 58 associated with the information handling system 14. Configuration table 58 may be stored locally on mobile telephone 12 or looked up through a local area network or other network interface to the configuration table 50 of administrative station 46. A second tap of mobile telephone 12, such as in response to an indication at display 60 that configuration information is available, results in a NFC communication in which configuration tool 68 communicates the configuration information to configuration module 66 for application by management processor 38. In one embodiment the configuration information is sent by the NFC communication; in an alternative embodiment, management processor 38 retrieves some or all of the configuration information through a network interface with information provided by mobile telephone 12. The configuration information may include a variety of things, including an IP address, a MAC address, BIOS settings, storage network settings, RAID settings, a system name, end user specific parameters, etc. In addition to establishing initial network configuration settings, the NFC communication can initiate testing at information handling system 14 once configuration or maintenance operations are complete. For instance, a configuration testing tool 70 sends test information to a configuration tester 72 running on management processor 38 to test that expected network communication is supported by information handling system 14. Configuration tester 72 applies the test information to send a message through management network 40 or other networks to mobile telephone 12 so that an end user standing proximate information handling system 14 can confirm proper configuration before leaving the location. In one embodiment, a NFC device 54 integrated with rack 16 communicates with CMC 24 to support interactions with an information handling system disposed in rack 16, such as where a legacy information handling system lacks a NFC device. Locating a NFC device 54 integrated with rack 16 or an information handling system 14 is aided by placing the NFC device proximate to indicators 52 and illuminating an indicator when information is ready for communication from an NFC device 54.

In some instances, as an information handling system 14 in a data center 10 receives maintenance, legacy components within the information handling system change over time when failed components are replaced. Configuration tool 68 establishes an initial entry in configuration table 50 by retrieving a unique identifier tag from an initially-deployed information handling system 10, providing configuration information in response to the unique identifier tag and then reading specific details from the information handling system 14, such as part numbers and firmware versions, and building an asset tracking table with detailed information on components for storage configuration table 50. After deployment, an inventory tool 74 running on a processor of mobile telephone 12 sends a NFC communication from NFC device 56 to NFC device 54 to obtain a hardware configuration of hardware components disposed in a chassis 44 of information handling system 14. An inventory module running on management processor 38 responds by providing a current inventory of hardware components as surveyed by management processor 38, such as by initiating queries to hardware components for a survey in response to the request by inventory tool 74. For instance, a list of component part numbers is retrieved to management processor 38 along with current firmware and software versions, and is then sent to mobile phone 12 with a NFC communication. Examples of components include processors, storage devices, BIOS, chipset processors and firmware, network resources and identifiers, virtual machine monitors, virtual machines, and even network devices physically connected to ports of the network resources.

In one embodiment, inventory tool 74 receives the inventory and downloads information from administration station 46 or other network locations to generate a visual depiction of the appearance of the interior of chassis 44 of information handling system 10 before the end user actually opens information handling system 10. The visual depiction includes a layout of the component locations and an indication of components in need of maintenance, such as by highlighting a failed storage device or other failed component in need of replacement. A compatibility tool 78 running on a processor of mobile telephone 12 compares legacy components disposed in chassis 44 with proposed replacement components to determine whether the proposed replacement components will work correctly if used to replace the legacy component. The visual depiction and compatibility results are presented at display 60 so that an end user can effectively plan on maintenance steps to be performed even before opening chassis 44 based upon information retrieved with NFC communications.

If an installed information handling system 14 detects a problem, such as with monitoring of operations by management processor 38, a maintenance event is indicated to administrative station 46 and is also indicated with visual indicators 52, such as predetermined indications by LEDs integrated at the outer surface of chassis 44 proximate to NFC device 54. Information technology specialists address maintenance events based upon notifications send through management network 40 or by responding to visual indications presented by visual indicators 52. In either case, an end user who approaches an information handling system 14 in response to a maintenance event obtains details regarding the event by retrieving a maintenance code with an NFC communication through NFC devices 54 and 56. The maintenance code and a unique identifier, also read with the NFC communication, allow the end user to confirm that maintenance is intended for an information handling system 14 with confirmation provided from administrative station 46 or another network location. Thus, an end user on location at an information handling system to perform maintenance need not rely only on visual indicators to locate the information handling system of interest. Further, proper authorization for work on an information handling system is controlled by communications from a mobile telephone 12 to administration station 46 before work takes place. In one embodiment, a lock 84 secures chassis 44 closed until access is authorized with credentials sent by NFC communication from a mobile telephone 12 based upon an authorization from administration station 46, which controls the lock credentials.

A maintenance tool 80 executing on a processor of mobile telephone 12 sends a request with NFC device 56 though an NFC communication to NFC device 54 for a maintenance code associated with an information handling system 14, such as for a maintenance event presented by visual indicators 52. A maintenance module running on management processor 38 provides the maintenance code to maintenance tool 80 with a second NFC communication, along with an identifier for information handling system 14 and, in one example embodiment, an inventory of component part numbers within the chassis or associated with the maintenance event. Display 60 of mobile telephone 60 presents the maintenance code, compatible replacement components and an image of the component within chassis 44, such as video depicting a replacement action. To confirm that an authorized replacement part is available, NFC communication with an NFC device of both the legacy and replacement component may be performed. In one embodiment, configuration information is retrieved with a NFC communication of mobile telephone 12 and the legacy component so that the configuration information may then be transferred from mobile telephone 12 to the replacement component with a second NFC communication. For example, RAID configuration may be transferred legacy RAID controller and RAID storage devices to a replacement RAID controller and RAID storage devices. As another example, virtual machine configuration information may be transferred from legacy network devices to replacement network devices. In one embodiment, lock 84 remains secured until the identity of the information handling system 14 under repair, the failed component and the end user performing the repair are confirmed with NFC communications between the information handling system and mobile telephone and network communications from the mobile telephone administrative station 46. In one alternative embodiment, maintenance components of rack 16 are authorized and performed in a similar manner with NFC communication to CMC 24, such as for replacement of a power supply 18, switch 20 or cooling fan 22.

Figure 2:
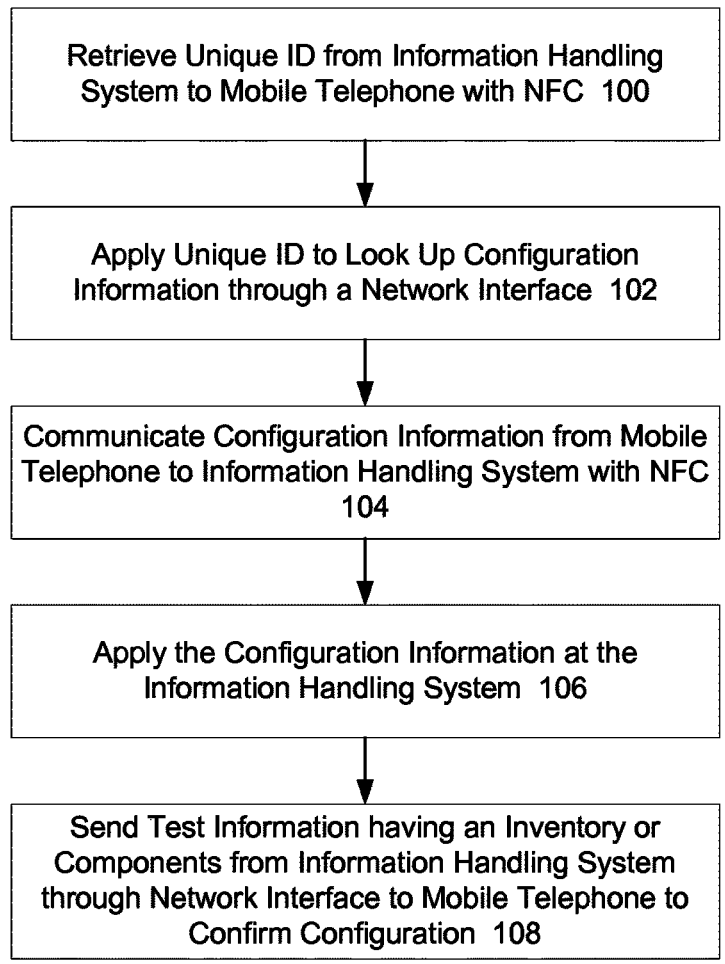
FIG. 2 depicts a flow diagram of a process for NFC communication between a portable information handling system and management processor to coordinate configuration at an information handling system.

Referring now to FIG. 2, a flow diagram depicts a process for NFC communication between a portable information handling system and management processor to coordinate configuration at an information handling system. The process begins at step 100 with retrieval from an information handling system to a mobile telephone of a unique identifier associated with the information handling system. At step 102, the unique identifier is applied to look up configuration information through a network interface, such as a WLAN or WWAN interface of the mobile telephone with a network administration location. The configuration information can include any number of factors for the information handling system as a whole or for individual hardware, firmware or software components within information, such as IP addresses, MAC addresses, virtual network address, storage addresses, BIOS settings, system names, security settings, etc. At step 104, configuration information is communicated from the mobile telephone to the information handling system with a NFC communication. At step 106, the configuration is applied at the information handling system with the management processor to configure the information handling system. At step 108, test information is sent from the information handling system to the portable phone through a network interface to confirm the configuration while the portable phone is physically near the information handling system. In one embodiment, the test information includes an inventory of server components to store for future reference.

Figure 3:
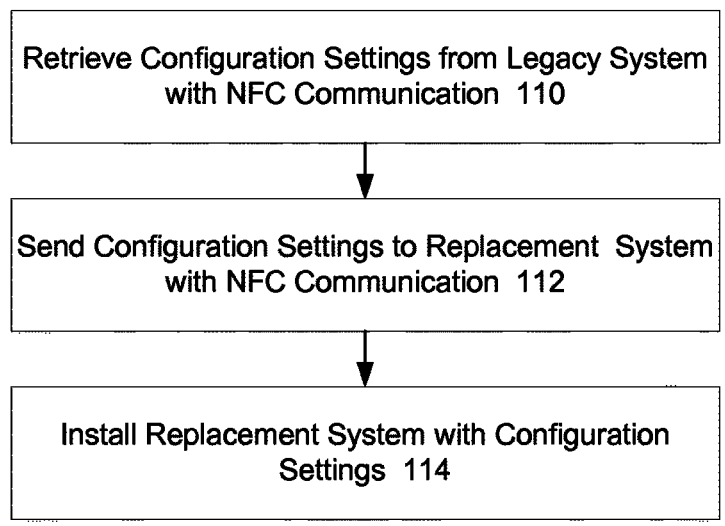
FIG. 3 depicts a flow diagram of a process for transferring a system configuration of a legacy system to a replacement system.

Referring now to FIG. 3, a flow diagram depicts a process for transferring a system configuration of a legacy system to a replacement system. The process starts at step 110 with retrieval of configuration settings from a legacy system to a mobile telephone with NFC communications. The legacy system may be an information handling system or a component within an information handling system, such as a network interface device, a storage device, software, or firmware. At step 112, the configuration settings are sent to a replacement system with an NFC communication from the mobile telephone. The mobile telephone acts as a convenient conduit via NFC communications for transferring a legacy system configuration to a replacement system. At step 114, the replacement system is installed with the configuration settings to replace the legacy system. For example, a replacement information handling system has legacy network configuration settings, such as IP addresses, installed so that the replacement information handling system interacts with the network similar to the legacy system that was replaced.

Figure 4:
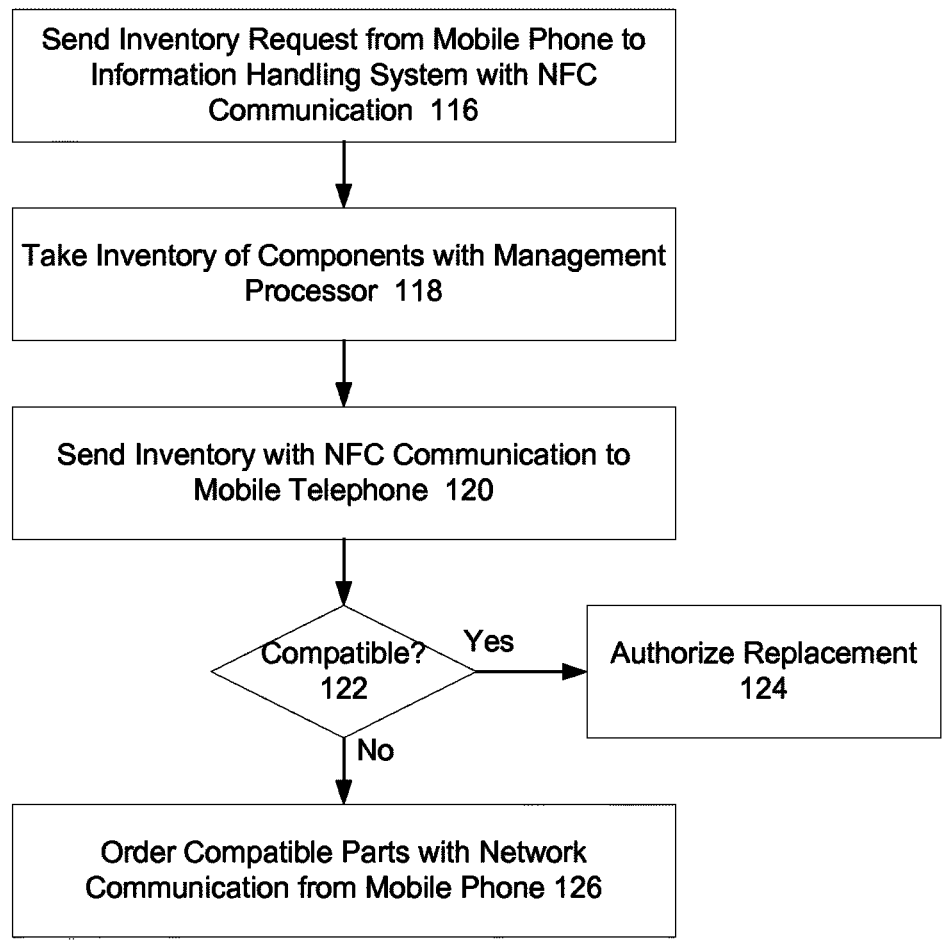
FIG. 4 depicts a flow diagram of a process for taking an inventory of an information handling system with NFC communication.

Referring now to FIG. 4, a flow diagram depicts a process for taking an inventory of an information handling system with NFC communication. The process begins at step 116 by sending an inventory request from a mobile telephone to an information handling system with NFC communication. At step 118, an inventory of components in the chassis of the information handling system is taken by querying the components for their parts numbers with the management processor. At step 120, the inventory is sent with NFC communication to the mobile telephone. The mobile telephone sends the inventory to a network administration location at step 112 to inquire whether a replacement information handling system or replacement component is compatible with the components of the inventory. If yes, the process continues to step 124 to authorize replacement. If the replacement is not compatible, the process continues to step 126 to order compatible components with network communications from the mobile phone.

Figure 5:
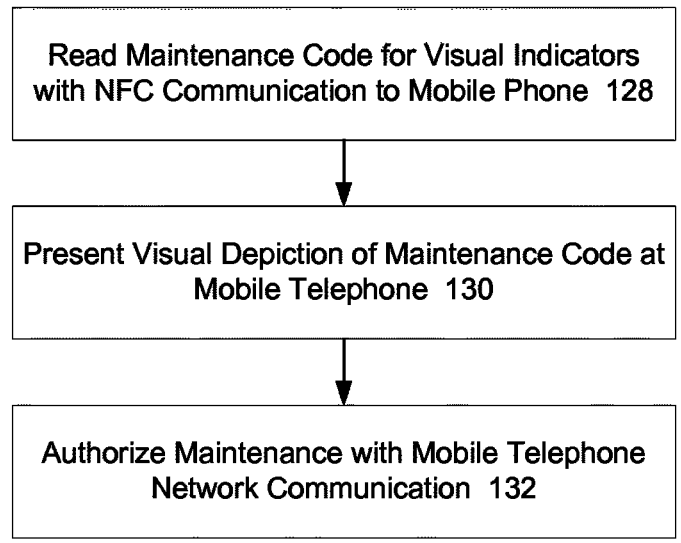
FIG. 5 depicts a flow diagram of a process for authorizing maintenance at an information handling system with NFC communications.

Referring now to FIG. 5, a flow diagram depicts a process for authorizing maintenance at an information handling system with NFC communications. The process starts at step 128 with reading of the maintenance code from an information handling system that has visual indicators that a maintenance event has occurred. The maintenance code and an identifier for the information handling system are sent to the mobile phone with a NFC communication. At step 130, a visual depiction of the components disposed in the information handling system chassis is depicted along with the maintenance code meaning. At step 132, authorization for maintenance is obtained with the mobile telephone by sending a request with the maintenance code and system identifier from the mobile phone through a network to a network administrator.

Although the present invention has been described in detail, it should be understood that various changes, substitutions and alterations can be made hereto without departing from the spirit and scope of the invention as defined by the appended claims.

What is claimed is:

1. A method for maintaining an information handling system, the method comprising:
   detecting a hardware component maintenance event at the information handling system;
   in response to detecting, presenting a visual indication of the hardware component maintenance event at the information handling system and communicating the hardware component maintenance event to memory associated with a NFC device at the information handling system; and
   reading the hardware component maintenance event from the NFC device with a portable information handling system having a NFC device, the hardware component maintenance event communicated with at least a maintenance code and an identifier of the information handling system, the portable information handling system determining a hardware component fault associated with the hardware component maintenance event from the maintenance code, presenting a visual image that depicts the location in the information handling system of the hardware component having the fault, and communicating the maintenance code and identifier through a network to a network administrator to obtain authorization for maintenance related to the maintenance code.

2. The method of claim 1 wherein the portable information handling system comprises a mobile telephone.

3. The method of claim 1 further comprising:
   in response to reading the hardware component maintenance event, presenting the hardware component maintenance event at a display of the portable information handling system; and
   presenting at the display maintenance actions for addressing the hardware component maintenance event.

4. The method of claim 3 wherein:
   in response to the reading the hardware component maintenance event further comprises at the portable information handling system, sending the hardware component maintenance event to an administrative network location to obtain maintenance actions; and
   presenting at the display maintenance actions further comprises presenting an image of the information handling system, the image including visual directions for performing the maintenance action at a depicted hardware component disposed in the information handling system.

5. The method of claim 1 wherein the hardware component maintenance event includes at least a network communication device failure, the method further comprising:
   obtaining at the portable information handling system network configuration information associated with the network communication device failure; and
   communicating the network configuration information from the portable information handling system NFC device to the information handling system NFC device.

6. The method of claim 1 wherein the hardware component maintenance event includes at least a storage device failure, the method further comprising:
   retrieving information regarding the hardware component maintenance event to the portable information handling system through a local area network; and
   applying the information at the portable information handling system to present an image of the location of a failed storage device in the information handling system.

7. The method of claim 6 further comprising:
   reading with the portable information handling system NFC device maintenance information from an NFC device of the failed storage device; and
   applying the maintenance information at the portable information handling system to confirm compatibility of a replacement storage device.

8. The method of claim 1 further comprising:
   locking the information handling system;
   retrieving information regarding the hardware component maintenance event to the portable information handling system through a local area network;
   retrieving information from a replacement hardware component to the portable information handling system with a NFC communication between the replacement hardware component and the portable information handling system; and unlocking the information handling system if the replacement hardware component matches the hardware component maintenance event.

9. The method of claim 8 wherein the unlocking further comprises sending authorization to unlock the information handling system from the portable information handling system to the information handling system through a NFC communication.

10. A system for maintaining hardware components of an information handling system, the system comprising:

a visual maintenance indicator disposed at the information handling system and operable to provide a visual indication of a hardware component maintenance event detected at the information handling system;

a portable information handling system having a maintenance tool operable to request a maintenance code associated with the hardware component maintenance event from the information handling system with a first NFC communication to the information handling system;

a lock physically restricting access to the information handling system; and a maintenance module running on the information handling system and operable to respond to the request with the maintenance code communicated to the portable information handling system with a second NFC communication;

wherein the maintenance tool presents the hardware component maintenance event at a display of the portable information handling system as an image of the hardware components of the information handling system and having a location of one or more of the hardware components associated with the hardware component maintenance event highlighted in the image, reads by a NFC transaction from a replacement hardware component information relating to the replacement hardware component, and authorizes access to the information handling system at the lock if the replacement hardware component is compatible with the information handling system.

11. The system of claim 10 wherein the maintenance tool is further operable to:

report the maintenance code to a network location through a local area network interface; and in response to the report, to receive maintenance information through the local area network interface for presentation at the display of the portable information handling system.

12. The system of claim 11 wherein the maintenance tool is further operable to unlock the information handling system to allow access to the hardware component after presentation of the maintenance information.

13. The system of claim 11 wherein the maintenance information comprises configuration information for application to a replacement hardware component, the maintenance tool further operable to communicate the configuration information to the information handling system with a third NFC communication.

* * * * *